April 19, 1949.    R. L. HODGKINS ET AL    2,467,828
SWITCHBOARD
Filed May 17, 1946
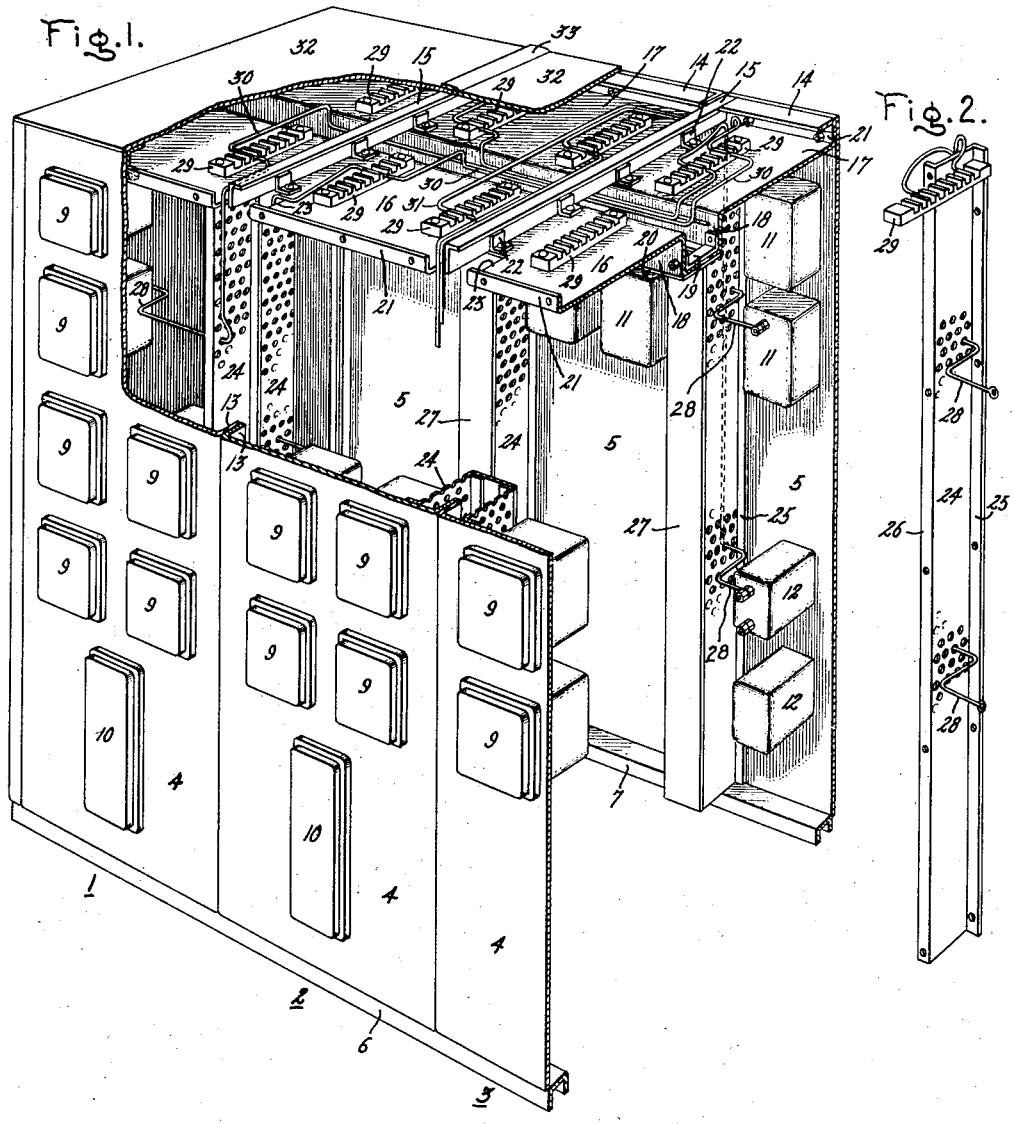
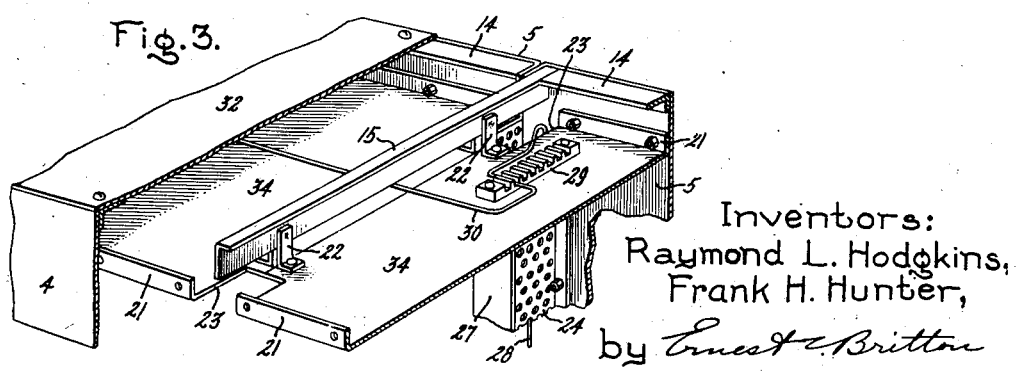
Inventors:
Raymond L. Hodgkins,
Frank H. Hunter,
by Ernest C. Britton
Their Attorney.

Patented Apr. 19, 1949

2,467,828

UNITED STATES PATENT OFFICE 2,467,828

SWITCHBOARD

Raymond L. Hodgkins, Yeadon, and Frank H. Hunter, Broomall, Pa., assignors to General Electric Company, a corporation of New York Application May 17, 1946, Serial No. 670,349

12 Claims. (Cl. 175—309)

Our invention relates to improvements in switchboards and particularly to improvements in switchboards, comprising a panel and spaced therefrom a parallel wall member, framework or another panel. More particularly our invention relates to improvements in duplex switchboards of the unit assembly type.

Duplex switchboards usually comprise a plurality of units each having two substantially vertical and parallel panels on which instruments, meters, relays and other devices are mounted. The panels of each unit are spaced back to back sufficiently for working operations between them such as mounting switchgear on the panels, making connections thereto, maintenance and repair. In general, these units are factory assembled and shipped together, although long switchboards may be shipped in sections which are arranged to be joined when the switchboard is installed. Such duplex switchboards support meters, relays, control devices and the like. Consequently, there is a great amount of wiring to be done. The magnitude of the wiring operation, however, must not interfere with the accuracy of the connections. It will be aparent, therefore, that the labor cost is a real item. In arrangements with which we are familiar, the structure required too many parts for interpanel and interunit wiring operations. Also, these arrangements did not provide sufficient wiring space. Moreover, these wiring operations could be performed only under inefficient working conditions which increased the time factor and cost and which were not conducive to quality output. Furthermore, from the standpoint of inside appearance, arrangements with which we are familiar leave much to be desired.

Besides duplex switchboards, similar problems arise in connection with enclosed switchboards wherein no instruments, meters, relays and other devices are mounted on the rear wall member or panel element which constitutes a rear enclosure for the front panel and the top structure of the switchboard. In some switchboard arrangements, the rear enclosure may be the wall of a building or a more or less open structural framework. However, as in the duplex switchboard, the same wiring problems are present.

An object of our invention is to provide an improved switchboard structure in which the number of parts to be fabricated and assembled is minimized. Another object of our invention is to provide an improved switchboard which has a generally better internal appearance. A further object of our invention is to provide an improved switchboard structure which has sufficient conveniently accessible wiring space, especially for interpanel and interunit wiring, whereby to effect a reduction in the time and cost of the wiring and an improvement in the quality thereof. These and other objects of our invention will appear in more detail hereinafter.

In accordance with our invention, we provide an improved switchboard comprising a plurality of units wherein the two panels of each unit are bridged by a deck on which terminal blocks are mounted. Wiring extending from the panels into and through wiring grilles, which are secured to the panels and which terminate at openings in the deck, is secured to these terminal blocks. Further in accordance with our invention, interpanel wiring and interunit wiring, either bunched or scattered or both as conditions may require, is mounted on the deck. Also, over the deck at a convenient distance therefrom, we provide a cover plate for protecting the wiring from dust, dirt, falling objects, unwarranted interference and the like.

Our invention will be better understood from the following description when considered in connection with the accompanying sheet of drawings, and its scope will be pointed out in the appended claims.

In the accompanying drawing, Fig. 1 is a perspective view with parts broken away of a duplex switchboard embodying our invention; Fig. 2 is a perspective view of a wiring grille and the wiring and terminal block thereof as assembled for mounting in the embodiment of our invention shown in Fig. 1; and Fig. 3 is a perspective view of a modification of the embodiment of our invention shown in Fig. 1.

In Fig. 1, we have shown, for the purpose of illustrating our invention, an end unit 1, an intermediate unit 2 and part of another unit 3 of a duplex switchboard embodying our invention. As shown, each of these units comprises two substantially vertical and parallel spaced panels 4 and 5 which are respectively suitably secured to sills 6 and 7 illustrated as channels with the web up. The panels 4 are shown as having mounted thereon relays 9 and 10, which preferably have drawout mountings of the type disclosed in United States Letters Patent 2,227,967, issued January 7, 1941 to the assignee of this invention. The panels 5 are shown as having mounted thereon instruments 11 and control switches 12 or the like. Each vertical edge of the panels 4 and 5 is flanged, and the abutting flanges 13 of two adjacent panels are suitably secured to each other to maintain the assembly and rigidity of structure. Along the top edges of the panels 4 and 5 there are suitably secured angles 14 for general fastening and stiffening purposes. For cross bracing and supporting purposes, we provide suitable means such as the transverse angles 15.

In accordance with our invention, we provide in each unit a deck extending transversely of the panels 4 and 5. As shown in Fig. 1, this deck comprises two similar members 16 and 17 so shaped as to provide a central longitudinal trough for interunit wiring. Also as shown, the trough sides 18 of these members 16 and 17 are braced by channel shaped pieces 19, and a cover plate 20 is provided. The arrangement is such that the troughs of the different units are colinear when the units are assembled. Flanges 21 on the deck members 16 and 17 serve to fasten these members to the panels at a predetermined distance below the upper end or edge of the panel. For further securing and supporting the deck members against movement, they are fastened to the cross bracing elements 15 by angle brackets 22. In order to provide pasageway for wiring from the devices on the panels, the deck members 16 and 17 are provided with suitable openings, such as corner notches 23.

Wiring supports or grilles such as perforated plates 24 extend lengthwise of the panels 4 and 5 adjacent the flanged edges thereof. As shown, these plates 24 have the form of a Z-bar with a wide web, which is perforated, and outstanding legs 25 and 26. The flanges 25 of the grilles 24 are suitably secured to the panels 4 and 5 so that the web of the grille is flush with the long edge of the notch 23 in the deck pieces 16 and 17. The spaced adjacent grilles 24 at panel junctions are provided with a cover plate 27 which is suitably secured to the flanges 26 whereby to complete a wiring trough. In the assembly of the switchboard, the grilles 24 are first provided with preshaped conductors or wires 28 for connections to the switchgear devices mounted on the panels. These wires pass from one side of the grille 24 to the other through the openings therein and upwardly along the grille to a terminal block 29 to which the wires are secured. The assembly of the grille 24 and its associated wires 28 together with the terminal block 29 is shown in Fig. 2. When the grille assemblies are mounted on the panels, the terminal block 29 associated with the cluster of wires 28 in any grille is passed through the deck notch 23 adjacent the grille. The terminal block is then mounted on the upper side of the deck 16—17 as shown in Fig. 1. Also, the wires 28 are connected to the respective switchgear devices.

For interunit wiring, wires 30, which are preferably preshaped and bunched if desired, are set in the deck trough formed by the flanges 18 of the deck members 16 and 17. These wires are secured to the terminal blocks in the respective units as shown in Fig. 1. For interpanel wiring in the same unit, preshaped wires 31 may be brought up from the vertical wiring troughs and carried across the deck to the terminal block 29 on the other side or the crossover may be made directly from the terminal block 29 on one side to the terminal block 29 on the other side as will be obvious to those skilled in the art.

From the foregoing, it will be apparent that all the interpanel and interunit wiring as well as the mounting of the treminal blocks can be accomplished from the top of the switchboard where everything is in sight and moreover in a convenient manner. This saves time in wiring and errors in connections. Arrangements embodying our invention also simplify the separation of long boards for shipping purposes and the subsequent assembly of the separated parts. Individual unit cover plates 32 with overlapping flanges 33 are suitably secured to the panel structure at the top in order to protect the wiring against damage from external forces.

Instead of building the deck from a plurality of members arranged to provide a central trough as shown in Fig. 1, the deck may be a flanged substantially flat member 34 as shown in Fig. 3. In this case, however, the deck is set farther down from the top of the panels in order to provide the desired wiring space for the interpanel and interunit wiring.

It will be apparent to those skilled in the art that as in enclosed boards, for example, no instruments, meters, relays and the like may be mounted on one of the panels 4 which would then constitute an enclosing member. However, this panel would, of course, have its wiring grille or grilles as shown to receive wiring coming through the floor of the building or from the top through partial length cover plates provided with suitable knockouts as will be obvious to those skilled in the art. In some cases, a building wall or other structure may constitute one of the panel elements although it does not serve as a mounting for switch gear devices.

While we have shown and described our invention in considerable detail, we do not desire to be limited to the exact arrangement shown, but seek to cover in the appended claims all those modifications that fall within the true spirit and scope of our invention.

What we claim as new and desire to secure by Letters Patent of the United States is:

1. In a duplex switchboard unit, two spaced panels, a deck extending transversely of said panels at a predetermined distance from one end thereof, said deck being provided with openings, wiring grilles extending lengthwise of the respective panels adjacent the edges thereof, wires passing from one side of each of said grilles to the other and through the openings in the deck, and a terminal block for the wires associated with each grille, said terminal block being mounted on said deck.

2. In a duplex switchboard, a plurality of units each comprising two spaced panels, a deck extending transversely of said panels at a predetermined distance from one end thereof, said deck being provided with openings, wiring grilles extending lengthwise of the respective panels adjacent the edges thereof, preshaped wires passing from one side of each of said grilles to the other and through the openings in the deck, a terminal block for the wires associated with each grille, said terminal block being mounted on said deck, a cover plate extending between the tops of said panels over said deck, and preshaped interunit wiring mounted in the space between said deck and said cover plate and extending between the terminal blocks on the decks of two of said units.

3. In a duplex switchboard unit, two spaced panels, a deck extending transversely of said panels at a predetermined distance from one end thereof, the corners of said deck being notched, perforated wiring plates projecting from the opposed faces of said panels and extending lengthwise of the respective panel adjacent the edges thereof, wires passing from one side of each of said plates through the perforations therein to the other side of the plates and through the notch in the deck adjacent the end of the respective plate, and a terminal block for the wires associated with each plate, said terminal block being mounted on said deck.

4. In a duplex switchboard, a plurality of units each comprising two spaced panels, a deck extending transversely of said panels at a predetermined distance from one end thereof, the corners of said deck being notched, perforated wiring plates projecting from the opposed faces of said panels and extending lengthwise of the respective panels adjacent the edges thereof, preshaped wires passing from one side of each of said plates to the other and through the notch in the deck adjacent the end of the respective plate, a terminal block for the wires associated with each plate, said terminal block being mounted on said deck, and preshaped interunit wiring supported by said deck and extending between the terminal blocks thereon in two of said units.

5. In a duplex switchboard unit, two spaced substantially vertical and parallel panels, a substantially horizontal deck extending between said panels at a predetermined distance from the top thereof, the corners of said deck being notched, perforated wiring plates secured to said panels adjacent their vertical edges and extending to the notches in said deck, wires passing from one side of each of said plates through the perforations therein to the other sides of the plates and through the notch in the deck adjacent the upper end of the respective plate, a terminal block for the wires associated with each plate, said terminal block being mounted on said deck, and a cover plate extending between the tops of said panels over said deck.

6. In a duplex switchboard, a plurality of units each comprising two spaced substantially vertical and parallel panels, a substantially horizontal deck extending between said panels at a predetermined distance from the top thereof, the corners of said deck being notched, perforated wiring plates secured to said panels adjacent their vertical edges and extending to the notches in said deck, wires passing from one side of each of said plates through the perforations therein to the other sides of the plates and through the notch in the deck adjacent the upper end of the respective plate, a terminal block for the wires associated with each plate, said terminal block being mounted on said deck, a cover plate extending between the tops of said panels over said deck, and interunit wiring mounted in the space between said deck and said cover plate and extending between the terminal blocks on the decks of two of said units.

7. In a duplex switchboard, a plurality of units each comprising two spaced substantially vertical and parallel panels, a substantially horizontal deck extending between said panels at a predetermined distance from the top thereof, the corners of said deck being notched, perforated wiring plates secured to said panels adjacent their vertical edges and extending to the notches in said deck, preshaped wires passing from one side of each of said plates through the perforations therein to the other sides of the plates and through the notch in the deck adjacent the upper end of the respective plate, a terminal block for the wires associated with each plate, said terminal block being mounted on said deck, a cover plate extending between the tops of said panels over said deck, preshaped interunit wiring mounted in the space between said deck and said cover plate and extending between the terminal blocks on the decks of two of said units, and preshaped interpanel wiring mounted in the space between said deck and said cover plate and extending between the terminal blocks of the panels of one unit.

8. In a duplex switchboard unit, two spaced panels, a deck extending transversely of said panels and having notched corners, said deck being provided with an intermediate trough extending transversely of the deck, perforated wiring plates projecting from the opposed faces of said panels and extending lengthwise of the respective panel adjacent the edges thereof, wires passing from one side of each of said plates to the other and through the notch in the deck adjacent the end of the respective plate, and a terminal block for the wires associated with each plate, said terminal block being mounted on said deck.

9. In a duplex switchboard, a plurality of units each comprising two spaced panels, a deck extending transversely of said panels and having notched corners, said deck being provided with an intermediate trough extending transversely of the deck, the troughs of said decks being substantially colinear, perforated wiring plates projecting from the opposed faces of said panels and extending lengthwise of the respective panel adjacent the edges thereof, preshaped wires passing from one side of each of said plates to the other and through the notch in the deck adjacent the end of the respective plate, a terminal block for the wires associated with each plate, said terminal block being mounted on said deck, and preshaped interunit wiring supported in the channel formed by said troughs and extending between the terminal blocks on the decks of two of said units.

10. In a switchboard unit, an upright panel, a horizontal deck extending transversely of said panel at a predetermined distance below the upper end thereof, said deck being provided with a notched side opening adjacent one vertical edge of the panel, a wiring grille extending below the deck lengthwise of the panel adjacent the one vertical edge thereof, wires mounted on the grille by passing from one side of said grille to the other for extending through the opening in the deck, and a terminal block connected to the wires mounted on said grille, said terminal block being movable through the notched side opening of the deck for mounting on top of said deck.

11. In a switchboard unit, an upright panel, a horizontal deck extending transversely of said panel at a predetermined distance below the upper end thereof, said deck being provided with a notched side opening adjacent one vertical edge of the panel, a wiring grille extending below the deck lengthwise of the panel adjacent the one vertical edge thereof, wires mounted on said grille by passing from one side of said grille to the other for extending through the opening in the deck, a terminal block connected to the wires mounted on said grille, said terminal block being movable through the notched side opening of the deck for mounting on top of said deck, and a cover plate over said deck.

12. In a switchboard, a plurality of units each comprising an upright panel, a horizontal deck extending transversely of said panel at a predetermined distance below the upper end thereof, said deck being provided with a notched side opening adjacent one vertical edge of the panel, a wiring grille extending below the deck lengthwise of the panel adjacent the one vertical edge thereof, preshaped wires mounted on the grille by passing from one side of said grille to the other for extending through the notched side opening in the deck, a terminal block connected to the wires associated with said grille, said terminal block being movable through the notched side opening for mounting on top of said deck, and preshaped interunit wiring supported on top of said deck and extending between the terminal blocks thereon in two of said units.

RAYMOND L. HODGKINS.
FRANK H. HUNTER.

REFERENCES CITED

The following references are of record in the file of this patent:

UNITED STATES PATENTS

| Number | Name | Date |
| --- | --- | --- |
| 1,886,296 | Neir et al. | Nov. 1, 1932 |
| 2,006,150 | Reed | June 25, 1935 |
| 2,065,897 | Kenner et al. | Dec. 29, 1936 |
| 2,140,376 | Anderson | Dec. 13, 1938 |
| 2,319,415 | Lightfoot | May 18, 1943 |
| 2,363,327 | Hodgkins et al. | Nov. 21, 1944 |

FOREIGN PATENTS

| Number | Country | Date |
| --- | --- | --- |
| 351,568 | Great Britain | June 29, 1931 |

OTHER REFERENCES

Theater Switchboards, a publication by Westinghouse Electric & Mfg. Co., Brooklyn, N. Y. page 11.